Dec. 18, 1956  A. C. KIDD  2,774,383
INSULATION FOR UNDERGROUND CONDUITS
AND METHOD OF PRODUCING THE SAME
Filed June 3, 1955

INVENTOR.
ALEXANDER C. KIDD
BY Gustav Drews
HIS ATTORNEY

United States Patent Office 2,774,383
Patented Dec. 18, 1956

2,774,383

INSULATION FOR UNDERGROUND CONDUITS AND METHOD OF PRODUCING THE SAME

Alexander C. Kidd, South Orange, N. J., assignor to Insul-Fil Co., Inc., New York, N. Y., a corporation of New Jersey Application June 3, 1955, Serial No. 512,953

8 Claims. (Cl. 138—68)

This invention relates to insulation for pipes or conduits embedded in concrete or underground, which pipes or conduits are used for conveying or transporting steam, gas, oil, fresh water and sea water, both hot and cold, and encased electric conductors and the like, or lines for light, power or communication systems. This application constitutes a continuation in part of co-pending application Serial No. 414,350, filed March 5, 1954, and now abandoned.

Among the objects of the present invention, it is aimed to provide an improved insulation barrier or enclosure for pipes or conduits embedded in concrete or underground, which pipes or conduits are used for conveying or transporting steam, gas, oil, fresh water and sea water, both hot and cold, and to encase electric conductors and the like, or lines for light, power or communication systems, which barrier and the method of producing the same is inexpensive and which will effectively resist corrosion from, and positively obstruct, water vapor, moisture, underground electric currents, soil chemicals, oils, fats, soil bacteria, fungi, parasites, termites and the like, and which will in turn also retard, if not entirely prevent, the dissipation of the heat in fluid being conveyed when the pipes or conduits are used for transporting fluids.

It is not new to embed pipes or conduits in protective material. In an endeavor to achieve the aforesaid result, the protective material heretofore used, however, has not only been expensive to produce, but unsatisfactory in many respects, as an instance, due to the bulk and weight of the same, and consequent excessive cost for transporting the same; due to the fact that it was frequently only obtainable in remote and inaccessible areas, the consequent excessive cost for long haul transportation of the same; and finally the inability of the same effectively to withstand corrosion and effectively to prevent the dissipation of heat in the fluid being conveyed when the pipes are used for conveying hot fluids such as steam, hot water, and the like.

Figure 1:
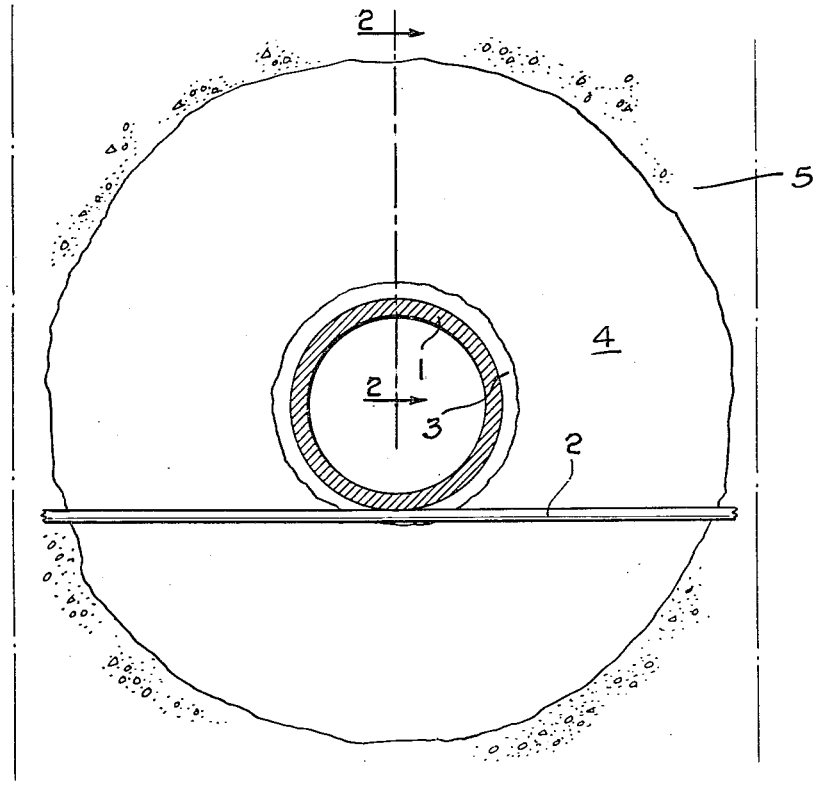
Figure 2:
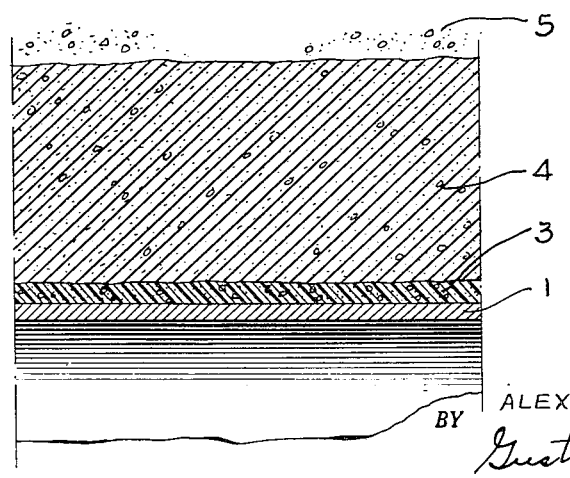

These and other features, capabilities and advantages of the insulation and the method of producing the same will appear from the subjoined detailed description of the same illustrated in the accompanying drawings, in which Fig. 1 is a cross section more or less diagrammatically showing a conduit embedded in concrete or underground, and Fig. 2 is a fragmental section along the line 2—2 of Fig. 1.

With pipes or conduits embedded in concrete or underground, particularly pipes or conduits for conveying steam or hot water, it has long been an object to encase the same in a protective covering which will constitute a barrier effectively to resist corrosion from, and positively obstruct, water vapor, moisture, underground electric currents, soil chemicals, oils, fats, soil bacteria, fungi, parasites, termites, and the like, and which will in turn also retard, if not entirely prevent, the dissipation of the heat in the steam or hot water so being conveyed.

According to the present invention as shown in the drawings, when the pipe or conduit 1 to be protected is embedded in concrete or underground, it will be placed upon rigid metal supports 2, and then a mixture consisting of expanded perlite coated with a high softening point hydrocarbon to the extent of 10% by volume of the coating to the expanded perlite and a high softening point hydrocarbon in a dry powdered state, poured around the pipe 1.

When the pipe 1 is so embedded or buried in this mixture, due to the heat in the pipe 1, especially if of a temperature of 200° F. to 500° F., in actual practice about 400° F., the mixture will divide itself substantially into two main zones, to wit, the plastic zone 3 in which the coated expanded perlite will fuse together, and the sintered or coalesced zone 4 where the heat in the pipe 1 aforesaid causes the high softening point hydrocarbon in a dry powdered state and the coated expanded perlite to be fused together resulting in a sintered substantially solidified mass. Outside of the zone 4 in the area 5 the mixture will remain more or less unaffected or unconsolidated, that is, neither fused together as is the case with the plastic mass of zone 3, nor sintered into the substantially solidified mass of zone 4. The aforesaid high softening point hydrocarbon is a by-product in the refinement of petroleum aphalt, generically known as a solvent precipitated asphalt resin, the chemical composition of which consists of the following ingredients and in the proportions by weight as indicated. Assuming the total weight to be 241.2 parts, the ingredients now to be named will have the parts by weights indicated, to wit:

| | Parts by weight |
|---|---|
| Asphaltenes | 49.0 |
| Resins | 48.5 |
| Saturated oils | 2.5 |
| Carbon | 87.4 |
| Hydrogen | 8.9 |
| Sulfur | 1.7 |
| Nitrogen | 0.7 |
| Oxygen (by diff.) | 1.3 |
| Ash | 0.2 |
| Carbon residue (ramsbottom) | 41.0 |

The physical properties of the high softening point petroleum asphalt hydrocarbon in a dry powdered state are substantially as follows:

| | |
|---|---|
| Specific gravity at 60° F | 1.07–1.10 |
| Softening point, in Fahrenheit degrees | 280–310 |
| Bitumen soluble in $CCl_4$ | 99.0 |
| Color (O. D.) | 373,000 |
| Acid value | 0.4 |
| Saponification number | 11.3 |

The perlite above referred to consists primarily of a volcanic rock or glass which is extensively found in the No Agua Mountains of Colorado, and has a silica content of about 65% to 70% by weight, an alumina content of 12% to 16%, a water content of 2% to 6%, and small amounts of the oxides of sodium, potassium, calcium and magnesium. This perlite ore, after having been crushed, graded and screened, is quick-heated to approximately 2000° F., when it will expand into glass-like beads or pearls of about ten to thirty times the original volume of the perlite ore as mined, each pearl being formed into a mass of air cells or voids which make the material not only light in weight but which effectively convert the same into a heat insulator to retard, if not entirely prevent, the dissipation of the heat from the pipe to be protected. In order to seal off these cells or voids against the entrance of water vapor and the like, the expanded perlite is coated with a high softening point hydrocarbon. The expanded perlite before being mixed with a high softening point hydrocarbon in a dry powdered state is coated with a hydrocarbon consisting of the same high softening point hydrocarbon, preferably by blowing the expanded perlite with the high softening point hydrocarbon in a dry powdered state at about 600° F. Excellent results have been achieved when the dry powdered hydrocarbon is a high softening point petroleum asphalt hydrocarbon having a softening point of approximately 325° F., which high softening point is achieved by a solvent precipitated method resulting in what is technically referred to as a solvent precipitated asphalt resin. In other words, after the perlite ore has been heated to about 2000° F. and expanded, then it is allowed to cool until its temperature drops to about 600° F., when the high softening point petroleum asphalt hydrocarbon in a dry powdered form is blown onto the same, causing the hydrocarbon to fuse and coat the expanded perlite particles upon contact of the hydrocarbon on the expanded perlite particles. The heating of the perlite ore to achieve the expansion desired aforesaid will preferably take place in a kiln at about 2000° F.

It will of course be obvious that when the heat generated in the conduit 1 exceeds 200° F. and hovers between 200° F. and 500° F., in actual practice about 400° F., it will cause the mixture of the high softening point hydrocarbon in a dry powdered state and the coated perlite not only to fuse into the plastic annular zone or inner layer 3, but also to adhere to the conduit 1 and the fringe of the sintered zone or outer layer 4, and that the sintered zone 4 will gradually change into the unaffected or unconsolidated area or zone 5 where the mixture is neither fused nor sintered. Obviously from an initial temperature of about 400° F. at the pipe or conduit 1, the temperature will gradually diminish in a radially outward direction so that the temperature will approximate 350° F. on the outer face of the plastic zone 3, and will diminish still further to approximate 280° F. on the outer face of the sintered zone 4. Furthermore, with a temperature of about 400° F. at the pipe 1, zone 3 would be about one-half inch in depth radially and be plastic, zone 4 would be about four to six inches in depth and be sintered or coalesced into a substantially solidified mass which is impervious to moisture and provide excellent insulation against the transfer of heat under all conditions. The condition of zone 4 gradually changes into the condition of the area or zone 5, where the mixture is neither fused, that is, plastic, nor sintered, that is, solidified, but to all appearances practically unconsolidated or loose.

From the foregoing, it thus appears that the invention consists essentially in placing the pipe to be protected on supports in a ditch, or against spacers in the wall of a building, to space the pipes from the bottom of the ditch or from the wall, thereupon to pour the mixture of expanded perlite coated with a high softening point petroleum asphalt and a quantity of powdered high melting point petroleum asphalt into the ditch or wall space.

The high softening point hydrocarbon or petroleum asphalt is applied in the dry powdered state. When coating the expanded perlite, the process is substantially as follows. The perlite as it comes from the mine is heated in a kiln to about 2000° F. Then when it cools to about 600° F. the high softening point hydrocarbon or petroleum asphalt in a dry powdered state is blown onto the hot perlite and is immediately melted and coats the perlite. The expanded perlite, due to the voids created in it when it expands under a temperature of 2000° F. constitutes an effective insulation, bearing in mind that insulation generally depends upon the formation of voids or void areas in the insulation material. However, due to the fact that the insulation property of the perlite will be destroyed or materially impaired if the voids are filled with moisture, these expanded perlites must be effectively protected from the entrance of moisture and the like into the voids. For this reason, the powdered high softening point hydrocarbon is applied to the outer surface of these perlites to seal off the voids or void areas from the admission of moisture.

After the pipe 1 to be protected is placed upon the supports or spacers 2, spaced from the bottom of the ditch or wall, the mixture consisting of this coated expanded perlite and a quantity of powdered high softening point hydrocarbon is poured into the ditch or wall area so that the pipe is effectively embedded or buried in this mixture.

Thereupon, due to the temperature in the pipes 1, especially when the temperature rises to 400° F., there will be created substantially two zones 3 and 4 by the insulation mixture. The inner zone 3 will be a plastic or fluid zone permitting the pipe 1, with contraction and expansion due to change in temperature of the pipe 1, to move in the zone 3 relative to the substantially solidified zone 4. Outside of this inner plastic zone 3, the second cylindrical zone 4 is substantially solidified and believed to be in a condition generally known as sintered. The pipe to be protected therefore is disposed in an inner cylindrical plastic insulation mass 3 which permits movement of the pipe and an outer sintered or solidified mass which together with the zone 3 constitute an effective barrier to water vapor, moisture, stray electric currents, fats and oils, soil chemicals, soil bacteria, fungi, parasites, termites and the like.

While the proportion of the quantity of coated expanded perlite relative to the powdered high softening point hydrocarbon may vary, excellent results have been achieved when the quantity of coated expanded perlite is about 50% of the mixture by volume as compared to 50% of the mixture by volume of the powdered high softening point hydrocarbon. While the hydrocarbon in powdered form used for coating the expanded perlite may differ chemically from the powdered high softening point hydrocarbon with which the coated perlite is mixed in the final mixture, excellent results have been achieved when the high softening point hydrocarbon in powdered form which is blown onto the expanded perlite to coat the same, is the same chemically as the high softening point hydrocarbon with which the coated expanded perlite is mixed in the final mixture.

In other words, the coated expanded perlite is about 50% by volume of the entire mixture where the coating on the perlite amounts to about 5% by volume, and the perlite without the coating amounts to 45% by volume and the dry powdered hydrocarbon amounts to about 50% by volume of the final mixture.

It is obvious that various changes and modifications may be made to the conduits and in the steps of the method without departing from the general spirit of the invention as set forth in the appended claims.

I claim:

1. The combination of a metal conduit, an inner annular plastic layer of a mixture of about 50% by volume of a hydrocarbon having a high softening point in Fahrenheit degrees of about 280 to 310 and of about 50% by volume of expanded perlite particles coated with a similar high softening point hydrocarbon in contact with and surrounding said conduit, and an outer substantially solidified layer of a sintered mass of said mixture.

2. The combination as set forth in claim 1 in which said inner layer is about one-half inch in depth and said outer layer is about four to six inches in depth.

3. The combination as set forth in claim 1 in which said high softening point hydrocarbon is a high softening point petroleum asphalt hydrocarbon and said perlite contains silica, alumina, water and the oxides of sodium, potassium, calcium and magnesium.

4. The combination of a metal conduit transmitting a heat of about 400° F., an inner annular plastic layer of a mixture of about 50% by volume of a hydrocarbon having a high softening point in Fahrenheit degrees of about 280 to 310 and of about 50% by volume of an expanded perlite coated with a high softening point hydrocarbon adhering to and surrounding said conduit in a plastic state when said conduit transmits a heat of about 400° F., and an outer substantially solidified layer of a sintered mass of said mixture merging into said inner layer.

5. The method of producing coated expanded perlite for a pipe insulation consisting in heating perlite ore to a temperature of about 2000° F. to form expanded perlite particles having a mass of cells or voids, allowing the expanded perlite particles to cool to about 600° F., and thereupon blowing a hydrocarbon having a high softening point in Fahrenheit degrees of about 280 to 310 in dry powdered form onto the expanded perlite whereupon the powdered hydrocarbon will fuse and adhere to the perlite particles upon contact, forming a coating of about one to nine by volume of the expanded perlite.

6. The method of encasing a hot medium-carrying conduit with an insulation consisting in embedding the conduit in a mixture of about 50% by volume of a hydrocarbon having a high softening point in Fahrenheit degrees of about 280 to 310 and of about 50% by volume of expanded perlite coated with a similar high softening point hydrocarbon, and transmitting heat at a temperature of about 400° F. from said conduit to said mixture in turn to form an inner plastic cylindrical layer of said mixture movably adhering to said conduit, and an outer substantially solidified cylindrical layer of said mixture merging into said inner layer.

7. The method as set forth in claim 6 in which said inner layer is about one-half inch in depth and said intermediate layer is about four to six inches in depth.

8. The method of encasing a hot medium-carrying conduit with an insulation consisting in heating perlite ore to a temperature of about 2000° F. to form expanded perlite particles having a mass of cells or voids, allowing the expanded particles to cool to about 600° F., thereupon blowing hydrocarbon having a high softening point in Fahrenheit degrees of about 280 to 310 onto the expanded perlite whereupon the hydrocarbon will fuse and adhere to the perlite particles upon contact, forming a coating of about one to nine by volume of the expanded perlite, thereupon embedding the conduit in a mixture of about 50% by volume of a hydrocarbon having a high softening point in Fahrenheit degrees of about 280 to 310 and of about 50% by volume of said expanded coated perlite, and transmitting heat at a temperature of about 400° F. from said conduit to said mixture in turn to form an inner plastic cylindrical layer of said mixture movably adhering to said conduit, and an outer substantially solidified cylindrical layer of said mixture merging into said inner layer.

References Cited in the file of this patent

UNITED STATES PATENTS

| Number | Name | Date |
| --- | --- | --- |
| 2,196,172 | Billings et al. | Apr. 9, 1940 |
| 2,625,512 | Powell | Jan. 13, 1953 |
| 2,668,125 | Baker et al. | Feb. 2, 1954 |